Oct. 22, 1957  J. H. DAWSON  2,810,338
BAKE PANS
Filed April 11, 1955

JOHN H. DAWSON
INVENTOR

2,810,338
BAKE PANS

John H. Dawson, Rockville, Md.

Application April 11, 1955, Serial No. 500,443

2 Claims. (Cl. 99—428)

This invention relates generally to cooking utensils and more particularly to an improved bake pan especially adapted for baking frankfurter sandwich rolls.

The well-known frankfurter roll is usually baked whole and then cut along one side, so that it can be spread open to receive a frankfurter and any desired condiments. In practice, however, it often happens that when a frankfurter is placed in the roll from the opened side, its bulk causes the roll to split along the uncut side when the sandwich is held in the hand, with the result that the condiments and frankfurter juices are spilled or squeezed out so that they fall on the clothing and soil the hands and mouth. The overall result of course is that the sandwich is hard to eat and thus looses some of its sales appeal.

An important object of the present invention, therefore, is to provide a frankfurter sandwich roll that is pre-shaped to receive the frankfurter, so that splitting, with the undesirable results described above, will be avoided. It is also an object to provide a bakery product which requires the performance of no cutting or other operation thereon after baking, but is ready for immediate use.

Another object of the invention resides in the provision of a bake pan which will toast the inner and outer surfaces of the roll, so that said roll will remain fresh for longer periods of time than will the well-known roll now in use, which quickly becomes dry and stale after it has been cut along one side to receive a frankfurter.

And a still further object is to provide a bake pan which can be used with conventional baking equipment without altering said equipment in any way.

Another object of the invention is to provide a bake pan which includes a plurality of identically formed baking recesses, so that a number of the frankfurter sandwich rolls, say a dozen or several dozen, can be baked simultaneously. The invention also provides a bake pan wherein each of the baking recesses is so designed that a small quantity of dough placed on one surface thereof will rise and completely fill the entire recess so that, when baked, it will produce a roll of oblong rectangular shape and having a slot to receive a frankfurter.

Other objects of the invention will become evident as the description proceeds.

Figure 1:
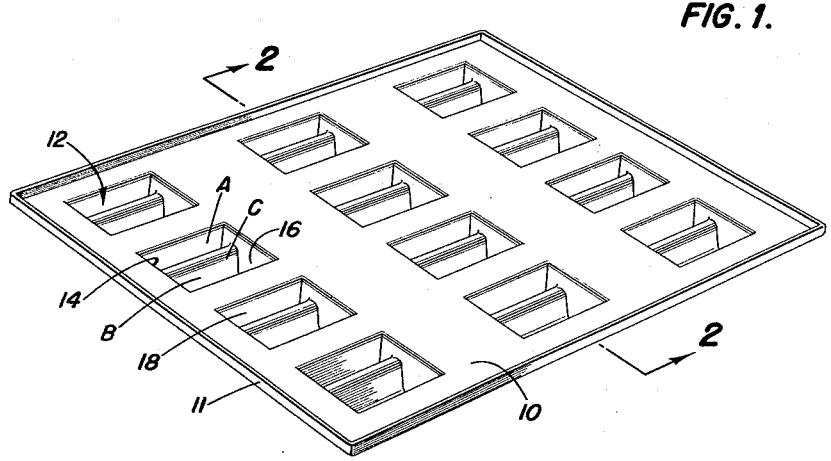
Fig. 1 is a perspective view of the improved bake pan.
Figure 2:
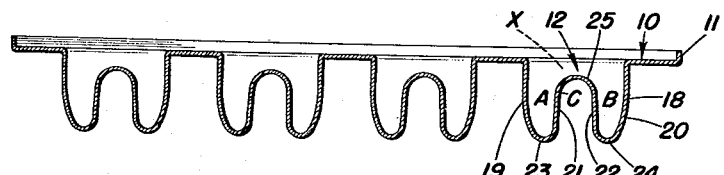
Fig. 2 is a section on the line 2—2 of Fig. 1.

Referring to the drawings in more detail, the new and improved bake pan constituting the present invention includes a rectangular tray 10 which is formed of aluminum or other suitable sheet metal. The tray 10 is reenforced by an upstanding rim or bead 11 which extends about its perimeter.

The tray 10 is provided with a plurality of integrally formed baking recesses or elements 12, arranged in rows. The tray 10, in Fig. 1, includes a dozen of the elements 12 but it should of course be understood that a greater or smaller number may be provided, as desired. A convenient way to manufacture my baking pan would be to stamp it from a sheet of aluminum or other metal. By the stamping method the complete pan, including the tray, the bead and the elements, may be formed in one operation. If a more rugged pan is preferred, to withstand rough usage, it may be cast of aluminum as a unit.

Figure 3:
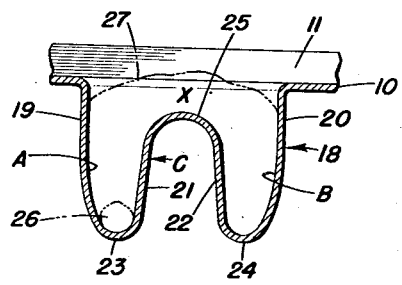
Fig. 3 is an enlarged detail section taken transversely of one of the baking recesses and showing, in broken lines, a roll ready for baking.

The baking elements 12 of the tray 10 are of identical formation, so that a description of one will suffice for all. A typical element 12 includes end walls 14 and 16 and an intermediate wall 18 which has outer side portions 19 and 20 and inner side portions 21 and 22. The side portions 19 and 21 and 20 and 22 are connected at their corresponding lower ends by bottom portions 23 and 24 which are roundingly mergent with said side portions. The corresponding upper ends of the side portions 21 and 22 are connected by a center portion 25 which is roundingly mergent with said portions 21 and 22. As best seen in Fig. 3, the outer side portions 19 and 20 and the end walls 14 and 16 depend vertically from the tray 10, whereas the inner side portions 21 and 22 converge toward their upper ends and are of reduced height, so that the upper extermities of the center portion 25 are disposed below the surface of the tray for defining a center, or web forming, area X, the function of which will be explained hereinafter.

It will be clear from the foregoing description and from a scrutiny of the drawings that the end walls 14 and 16 and the portions of the intermediate wall 18 cooperate to define troughs and a cavity forming member, the troughs being shown at A and B and the cavity forming member at C.

In use, a strip or roll of self-rising dough, shown in dotted lines at 26, is placed in one of the troughs A or B, say the trough A. As this dough rises it will entirely fill the element to produce a frankfurter roll ready for baking. More specifically, the roll of dough 26, as it rises, will first extend along the bottom of the trough A and thence upwardly along the side portions 19 and 21 thereof, and also into engagement with the end walls 14 and 16. As the dough continues to rise, it will move up the wall 21, which is slightly inclined toward the wall 22, and over the center portion 23 into the trough B so that, when the rising operation has been completed, the dough will, as shown in broken lines at 27, completely fill the element. The area X will define a web 28 connecting the parts of the roll in the troughs A and B, and the cavity forming member C will define a trough or cavity 29 for receiving a frankfurter or other food product. As will be seen from a close scrutiny of Fig. 3, the side portions 19 and 21 and 20 and 22 converge toward their lower ends more sharply than do the side portions 21 and 22 toward their upper ends, with the result that the troughs A and B are narrower than the trough C and the center portion 25 has a radius greater than the radii of the bottom portions 23 and 24. The overall result of this formation is a baking pan which will produce a roll having relatively thin side members connected by a web and terminating in free edges semi-elliptical in cross-section, and a relatively wide and deep round-bottomed cavity. The cavity is capable of receiving a frankfurter singly and without spreading the side members and causing splitting at the web. Moreover, the free edges of the relatively thin side members will, when the sandwich is held in the hand, be caused to move toward each other and thus to close the open side of the cavity for retaining heat and any condiments in the roll.

Figure 4:
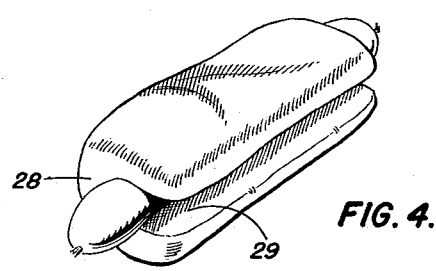
Fig. 4 is a perspective view of a frankfurter sandwich roll baked in the bake pan constituting the present invention, a frankfurter being shown in the trough or recess formed in the roll during baking thereof.

In Fig. 4 there is shown a frankfurter roll baked in the improved bake pan of the present invention, with a frankfurter therein.

What is claimed is:

1. As a new article of manufacture, a bake pan for baking frankfurter rolls, comprising a baking element including end walls and an intermediate wall cooperating to define a pair of relatively narrow dough receiving troughs and a member between the troughs forming a relatively wide cavity, said member being so shaped that dough rising in one of said troughs will extend about said member and into said other trough and into engagement with the end walls for froming a sandwich roll, said member forming a cavity in the roll throughout its length, the intermediate wall including straight outer side portions and inclined converging inner side portions, roundingly mergent bottom portions connecting adjacent inner and outer side portions, and a roundingly mergent center portion connecting the inner side portions.

2. As a new article of manufacture, a baking pan including a baking element having an intermediate wall shaped to define relatively narrow dough-receiving troughs and a relatively wide cavity between the troughs, end walls closing the troughs at their opposite ends, the intermediate wall having outer side portions and having a center portion which terminates at its upper extremities in a plane spaced from the plane including the upper edges of the end walls for defining a dough-receiving web-forming area, said area being disposed medially between the upper edges of the outer side portions above the center portion and being of restricted height and width compared to the height and width of the element, cooked dough in the area providing a connection for cooked roll sections in the troughs and closing the cavity at its inner extremities.

References Cited in the file of this patent
UNITED STATES PATENTS

| | | |
|---|---|---|
| 661,273 | Park | Nov. 6, 1900 |
| 2,012,815 | Hodges | Aug. 27, 1935 |
| 2,091,422 | Steffan et al. | Aug. 31, 1937 |
| 2,188,492 | Young | Jan. 30, 1940 |